Sept. 10, 1935.  L. F. SAVAGE  2,013,842
APPARATUS FOR THE OPTICAL REPRESENTATION
OF OBJECTS WITH STERESCOPIC EFFECT
Filed Oct. 24, 1931   7 Sheets-Sheet 7

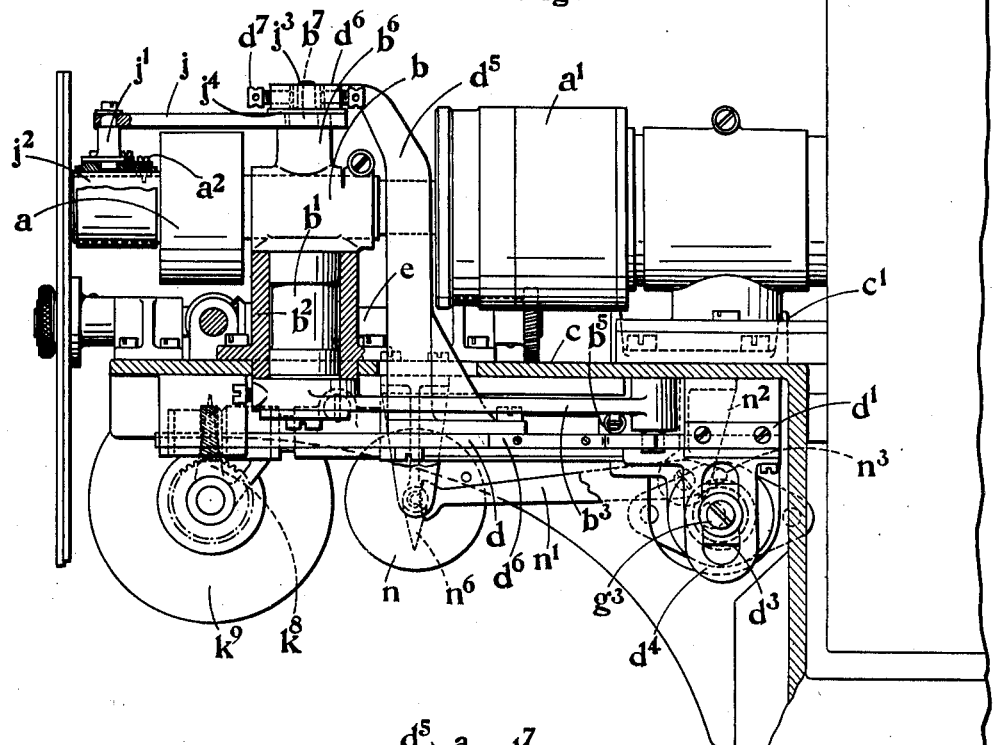
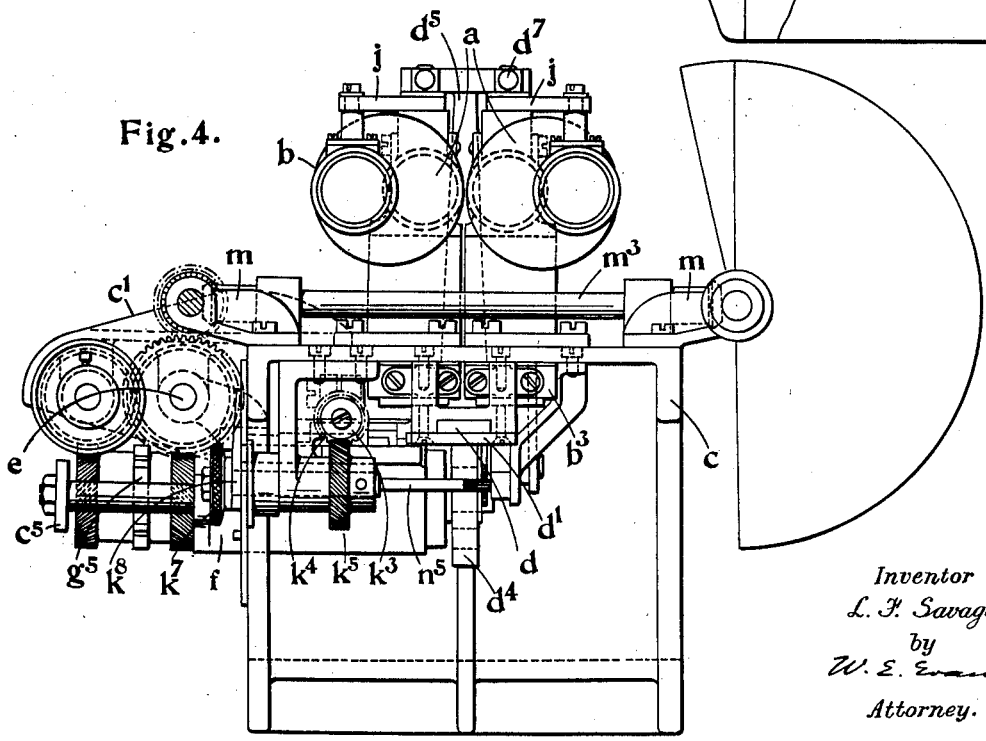

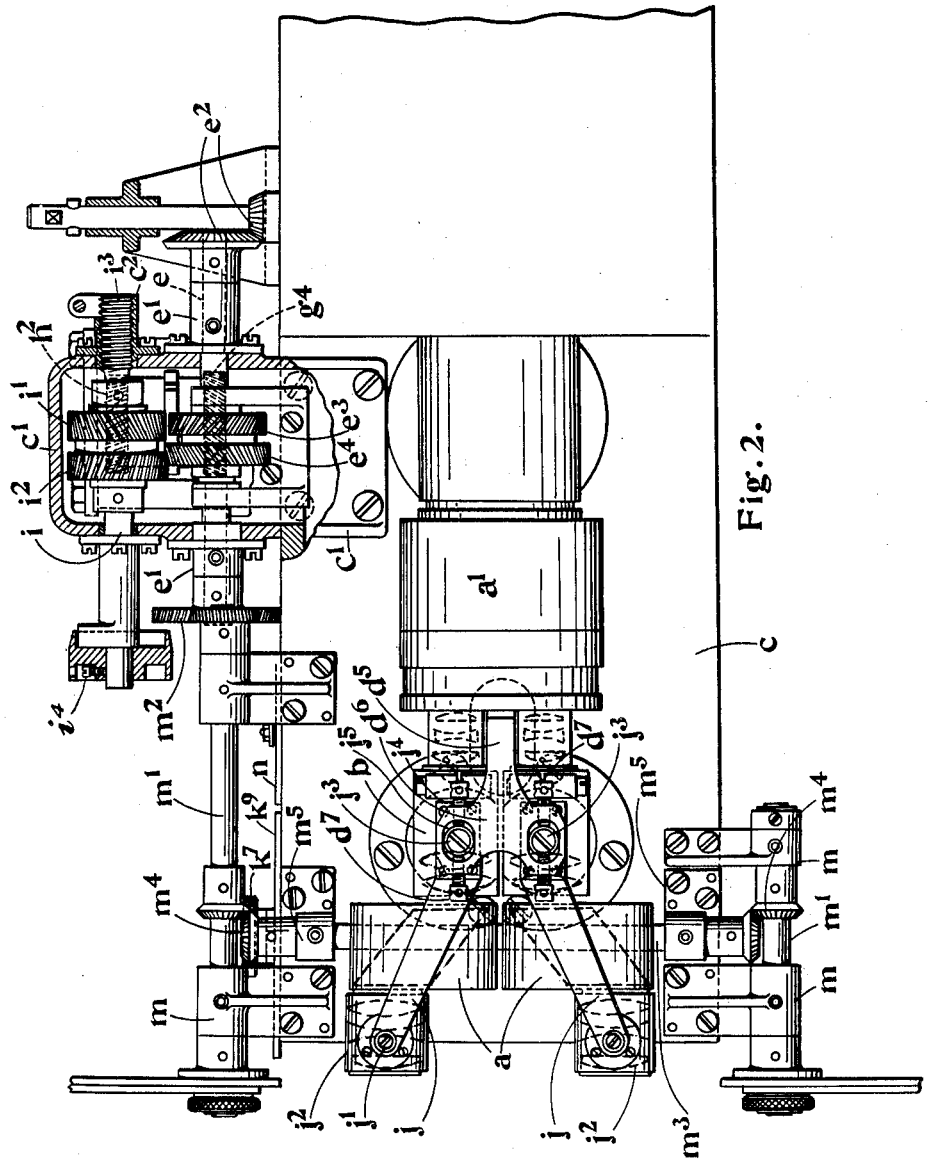

Inventor
L. F. Savage.
by
W. E. Evans
Attorney.

Patented Sept. 10, 1935

2,013,842

UNITED STATES PATENT OFFICE 2,013,842

APPARATUS FOR THE OPTICAL REPRESENTATION OF OBJECTS WITH STEREOSCOPIC EFFECT

Lawrence Francis Savage, London, England

Application October 24, 1931, Serial No. 570,880
In Great Britain April 1, 1931

19 Claims. (Cl. 88—16.6)

This invention relates to the optical representation of objects with stereoscopic effect and is especially applicable to the production of cinematographic representations and for use in wireless and telegraphic image projection and for other purposes where there may be utilized an image that is formed by objective lenses or the like serving as components of optical systems which are adapted to throw images in superposition on one and the same picture space.

In binocular vision, when the eyes are directed upon a number of objects disposed at different distances from the view point, the stereoscopic effect giving an impression of depth or distance in the picture seen arises from the almost subconscious concentration of the gaze first upon one object and then upon another, the eyes being focussed and the axes adjusted for each object plane in turn. In order, therefore, to secure a stereoscopic effect that is true to life it is essential that the separate view point images formed by the optical systems of the objects disposed in different planes should be suitably superposed on the picture space and that simultaneously the optical systems should be focussed for the particular distance of the objects in superposition at the moment. It is further desirable that the change from one object plane to another, or the speed of motion of the optical systems or of the parts thereof for this purpose and for focussing, and in fact all movements relating to the separate view point images, such as dissolving movements, should depend on the persistence of vision. Thus, the changes referred to may be effected with a time interval of, for example, one fourth to one sixth of a second.

The invention has among its objects to provide means whereby this result may be attained by movements imposed upon the optical systems or certain of their components.

According to the invention the optical systems serving to form the separate view point images, or certain components of the said systems are given two movements, one of which serves to effect the adjustment of the optical systems to secure successively the superposition of the object planes at different distances within a determined range, while the other movement effects an adjustment of the objectives or other components of the optical systems whereby the said object planes are effectively focussed at the moment they are brought into superposition.

According to the invention, moreover, the movement for effecting superposition of the various object planes may be effected by imparting to the optical systems or components thereof an angular movement of oscillation of reciprocation about vertical axes transverse to the axes of the said optical systems.

According to the invention, moreover, the said movement for securing superposition of the object planes may be effected by giving to the optical systems or components thereof a movement laterally or transverse to their axes in the horizontal plane.

According to the invention, moreover, for securing focus of the objects simultaneously with their superposition the objective lenses or other components of the optical systems may be given an axial movement of oscillation or reciprocation that is in coincidence with and proportion to the movement that results in the superposition of the said object planes.

According to the invention, moreover, the movements of the optical systems or the components thereof for effecting both the superposition of the object planes and the focus of the said object planes may be effected in dependence one on the other. Thus, the movements may have a common source.

According to the invention, moreover, mechanism may be provided for effecting the movements of the optical systems or components thereof as hereinbefore stated under conditions whereby the depth of the field of view that is under treatment may be varied and simultaneously the necessary adjustment of focus may be effected.

In the specification of application Serial No. 486,399 filed on the 4th October 1930 there are described optical systems for producing cinematographic representations of stereoscopically related images, whereby the separate view point images may be superposed on the same picture space at the focal plane. The present invention is applicable to optical systems as described in the specification referred to and also to other types of optical systems having the same function.

For the purpose of the invention it is necessary that the optical systems, comprising, for instance, two series of lenses or equivalent components, or certain of the components of such optical systems should be adapted to receive a reciprocatory movement either about a pivotal axis or in a transverse direction, and that simultaneously the objective lenses should be focussed to correspond. Such movements may be produced by mechanism of widely differing kinds without departing from the scope of the invention.

By way of example three designs of mechanism embodying the invention are hereinafter described with reference to the accompanying drawings.

Figure 1 is a side elevation, partly in section, of one design of mechanism.

Figure 2 is a plan view corresponding to Figure 1, also partly in section.

Figure 4 is a front elevation corresponding to the preceding figures.

In the mechanism illustrated, by way of example, in Figures 1–5 of the accompanying drawings, the optical systems, which may be of any suitable type whereby the separated view point images are superposed on the same picture space, may be contained within two lens tubes $a$ disposed side by side and may comprise the respective objective lenses and, if necessary, intermediate lenses, prisms and other components which, in conjunction with a superposing lens $a^1$, serve to effect the superposition of the separated view point images.

With such an optical system the lens tubes $a$ are provided to pivot about vertical axes positioned at a convenient point in their length and the objective lenses are mounted in the lens tubes in such manner that their mounts may be reciprocated within the lens tubes.

Figure 3:
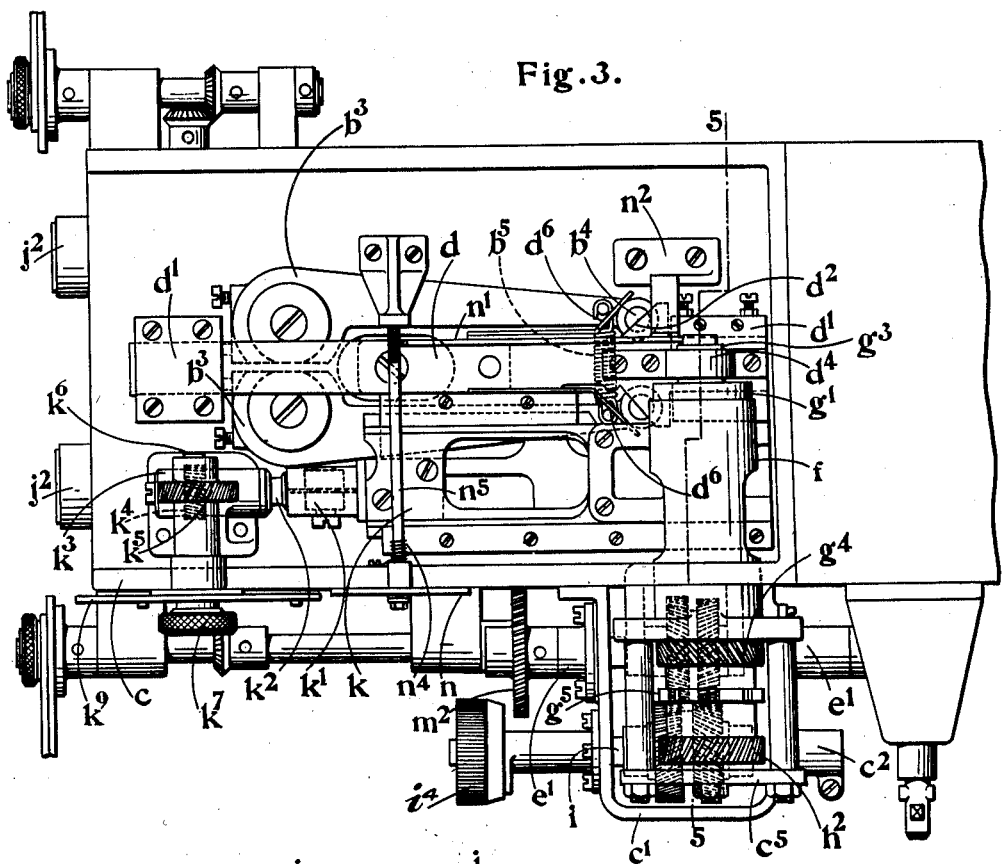
Figure 3 is an underside plan view corresponding to Figures 1 and 2.
Figure 5:
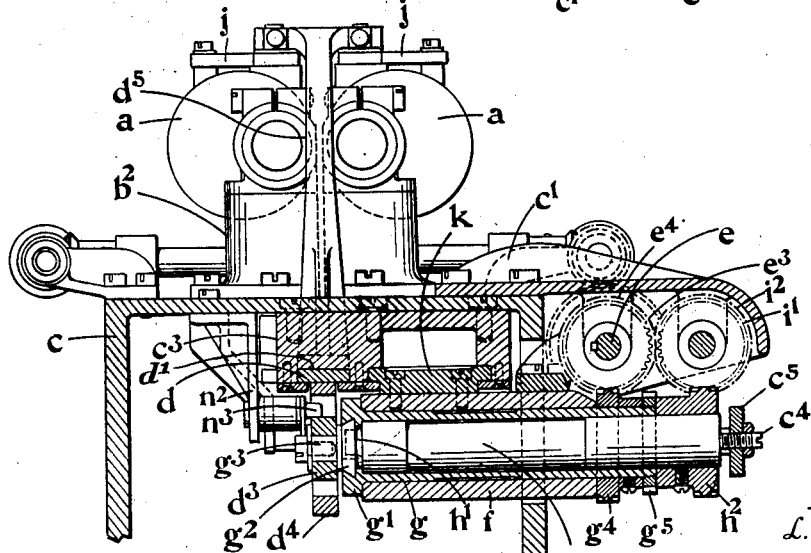
Figure 5 is a detail cross-sectional view on the lines 5—5 of Figure 3.

To effect the movements referred to the lens tubes $a$ are supported in sleeves $b$ which are carried by downwardly depending pivot pins $b^1$ rotatably disposed within pedestals $b^2$ fixedly mounted upon a base plate or supporting bracket $c$. The said spindles extend through the base plate and carry at their extremities levers or arms $b^3$ secured in position by such means as fixing screws and extending rearwardly parallel with the under surface of the base plate $c$. An operating bar $d$ is slidably mounted in bearings $d^1$ provided respectively upon the under face of the base plate and upon a fitting $c^3$ mounted on the said base plate, the bar occupying such a position that it may be reciprocated along a middle line disposed between the two levers or arms $b^3$. As shown in Figure 5, the bearing $d^1$ on the fitting $c^3$ is formed as a recess in the fitting in which the bar $d$ is confined by retaining plates covering the lateral edges of the bar. Towards the free ends of the levers or arms the bar $d$ is provided or formed with lateral surfaces $d^2$ inclining outwardly from the axis of the bar and adapted to engage with studs or contact pins $b^4$ respectively mounted upon the extremities of the levers or arms $b^3$, the operative portions being of semi-circular shape and bearing against the surfaces $d^2$ with their flat surfaces. The levers or arms are caused to maintain the contacts or studs $b^4$ in engagement with the bar $d$ by means of a tension spring $b^5$ connected between them, while at the same time auxiliary means of maintaining the studs or contacts $b^4$ in engagement with the inclined or cam surfaces $d^2$ of the bar $d$ may be provided in the form of leaf springs $d^6$ mounted upon the bar and bearing upon the sides of the contacts or studs opposite to the surfaces contacting with the cam surfaces $d^2$ of the bar.

The construction of the mechanism is such that if the bar $d$ be given a reciprocatory movement in the direction of its length, the lens tubes $a$ will be oscillated about their spindles $b^1$ by the oscillation of the levers or arms $b^3$.

The reciprocatory movement of the bar $d$ is suitably derived from the operating gear of the camera through a driven spindle $e$ carried by a hollow supporting bracket $c^1$ secured to and extending laterally from the base plate $c$, the spindle being disposed in bearings $e^1$ mounted upon the exterior of the oppositely disposed walls of the bracket $c^1$. The driven spindle $e$ has its axis parallel with the longitudinal axis of the bar $d$ and is driven from the operating gear of the camera through bevel gear $e^2$. For the conversion of the rotation of the driven spindle into a reciprocatory movement of the bar $d$ there is provided a bearing sleeve $f$ transversely disposed to the driven spindle $e$ in a position below the base plate and supporting within it a rotatable sleeve $g$, which, adjacent the bar $d$, is provided with a head $g^1$ in which is disposed a transverse slide block $g^2$ carrying a crank pin $g^3$ which is rotatably fitted in a slide block $d^3$ mounted within a longitudinal slot in an arm $d^4$ extending at right angles from and secured to the bar $d$. The said slide block $g^2$ is capable of adjustment of position in the diametrical direction of the said sleeve $g$ for adjustment of the eccentricity of the crank pin $g^3$ by engagement with an eccentric pin $h^1$ provided at the end of a spindle $h$ rotatably mounted within the said sleeve $g$ and contacting with a thrust-bearing pin $c^4$ adjustably secured in a bridge member $c^5$ supported by screwed distance pins from the outer end of the bearing sleeve $f$. The bearing sleeve $f$ extends outwardly through an opening in the lateral web of the base plate $c$, and at the outer end the sleeve $g$ is provided with an annular helical gear $g^4$ fixed thereon and confined by a lock nut $g^5$, which helical gear is in engagement with a helical gear $e^3$ fixedly mounted upon the driven spindle $e$, while similarly the spindle $h$ within the sleeve $g$ has fixedly mounted thereon and confined by a lock nut a helical gear $h^2$ of the opposite hand which is in engagement with a corresponding gear $i^1$ mounted loosely upon a counter spindle $i$ disposed parallel with the driven spindle and carried by the supporting bracket $c^1$. The counter spindle $i$ is provided with a second loosely mounted helical gear $i^2$ of the opposite hand to the gear $i^1$, to which it is secured or with which it is integral. The gear $i^2$ is in engagement with a corresponding helical gear $e^4$ integral with the gear $e^3$ or fixed on the driven spindle $e$, through which the rotation of the driven spindle is transmitted to the gear $i^2$ and thence by the gear $i^1$ and the gear $h^2$ to the spindle $h$ within the sleeve $g$.

The reciprocatory movement of the lens tubes $a$ it will be understood has for its purpose successively to bring into superposition the objects of the separated view point images which are disposed at different planes, and in order that the depth of field over which such superposition of the several planes may be effected may be modified it is necessary that the eccentricity of the crank pin $g^3$ of the transverse slide block $g^2$ should be variable. For this purpose the counter spindle $i$ is provided to be axially movable in the supporting bracket $c^1$, the extremity thereof being formed or provided with a screw-threaded portion $i^3$ which is received into a screw-threaded nut $c^2$ of fixed position carried by the supporting bracket $c^1$ and the helical gears $i^1$, $i^2$ are, as before stated, integrally formed or secured together and rotatably mounted upon the counter spindle $i$ between retaining collars fixed thereon. The second extremity of the counter spindle $i$ extends outwardly through a bearing sleeve carried by the fitting $c^1$ and has fixedly mounted upon it a knurled head $i^4$ by which the counter spindle may be rotated. The knurled head $i^4$ is advantageously provided with a plain bevelled lateral rim which may bear graduations adapted to be read against an index mark borne by a lug or finger carried by or forming part of the bearing sleeve. Thus, by rotation of the counter spindle an axial movement is given thereto by the engagement of the screw-threaded portion $i^3$ with the fixed nut $c^2$ and the helical gears $i^1$, $i^2$ are given a movement of translation across the faces of the gears $e^3$, $e^4$ upon the driven spindle $e$, and by reason of the direction of their respective teeth such movement results in a partial rotation of the gears $i^1$, $i^2$ upon the counter spindle $i$ in relation to the gears $e^3$, $e^4$ and a consequent movement of rotation of the gear $h^2$ and the spindle $h$ within and relatively to the rotatable sleeve $g$ and thus of the eccentric pin $h^1$ relatively to the transverse slide block $g^2$.

For the reciprocatory movement of the objective lenses for focussing the objects in different object planes successively, the operating bar $d$ is provided with an upstanding arm $d^5$ extending through a slot in the base plate $c$ between the levers or arms $b^3$ and carrying at its upper end a cross-head $d^6$ to which are pivotally connected two forwardly extending arms $j$ which at their outer ends are provided pivotally to engage pins $j^1$ secured to sleeves $j^2$ which embrace the lens tubes $a$ and serve to carry operating pins $a^2$ extending through longitudinal slots in the lens tubes for engagement with the lens mounts. To permit of initial adjustment of focus or setting of the lenses the cross head $d^6$ is provided with a longitudinal slot in respect of each arm $j$ into which is received an upstanding pin $j^3$ mounted upon the said arm by means of a base plate $j^4$ and fitting into a sleeve or slide block $j^5$ disposed in the said slot which sleeve or slide block is retained in the adjusted position by oppositely disposed adjusting screws $d^7$ carried by the cross head. The axial movement of the arms $j$ relatively to the lens tubes $a$ or pedestals $b^2$ is permitted by the provision on the sleeves $b$ of bosses $b^6$ upon which the rear ends of the arms slidably rest and on which there are provided constraining studs or pins $b^7$ which are fitted in longitudinal slots in the ends of the arms $j$.

In order that the optical system may be focussed according to the average distance of a particular group of objects or view, the bearing sleeve $f$ is mounted upon a slide $k$ which is mounted in a slideway formed on the fitting $c^3$ and disposed parallel with the slide bar. The slide $k$ is provided with a longitudinal disposed screw-threaded nut $k^1$ which is fitted to the slide by a lug or extension secured by screws and engages a screw-threaded axially disposed spindle $k^2$ rotatably mounted in a bearing bracket $k^3$ fixed to the underside of the base plate $c$ and provided with a helical gear wheel $k^4$ which is engaged by a corresponding gear wheel $k^5$ mounted upon a transversely disposed control spindle $k^6$ also carried in the bearing bracket $k^3$, or a separate bracket, the said spindle $k^6$ being provided at the outer extremity with a control knob $k^7$ having an index or pointer $k^8$ adapted to travel over a graduated disc $k^9$ mounted upon the bearing of the control spindle $k^6$. Thus, upon the rotation of the control knob $k^7$ the screw-threaded spindle $k^2$ is rotated and by its engagement with the nut $k^1$ draws forward the slide $k$ which carries with it the bearing sleeve $f$ and thus the mechanism contained therein and by the engagement of the crank pin $g^3$ of the slide block $g^2$ with the arm $d^4$ of the slide bar $d$ any movement of the said sleeve $f$ is communicated to the objective arm $d^5$ and the operating arms $j$ controlled thereby. Brackets $m$ mounted upon the base plate $c$ serve to carry two longitudinally disposed spindles $m^1$ one of which is rotated from the driven spindle $e$ of the operating mechanism through helical gear $m^2$ and transmits rotation to the other of the said spindles by way of bevel gearing $m^4$ and a transversely disposed spindle $m^3$ carried across the upper side of the base plate $c$ and mounted in bearing brackets $m^5$ secured thereon. The said spindles serve to effect the rotation of two variable obturating shutters co-operating with the respective objective lenses.

The extent of the movement of the operating or slide bar may conveniently be shown upon an indicating dial $n$ by means of a lever $n^1$ pivotally carried in a bracket $n^2$ on the underside of the base plate and having at one end a laterally extending contact stud $n^3$ which engages one end of the block $g^2$ which slides in the slot of the slide bar arm $d^4$, being maintained in its engagement by the action of a spring $n^4$. Such lever $n^1$ is at the other extremity formed with a toothed segment which engages and drives a toothed pinion upon a transversely disposed spindle $n^5$ carried in bearings on the base plate and extending outwardly beyond the dial $n$ for the reception of a pointer $n^6$.

Figure 6:
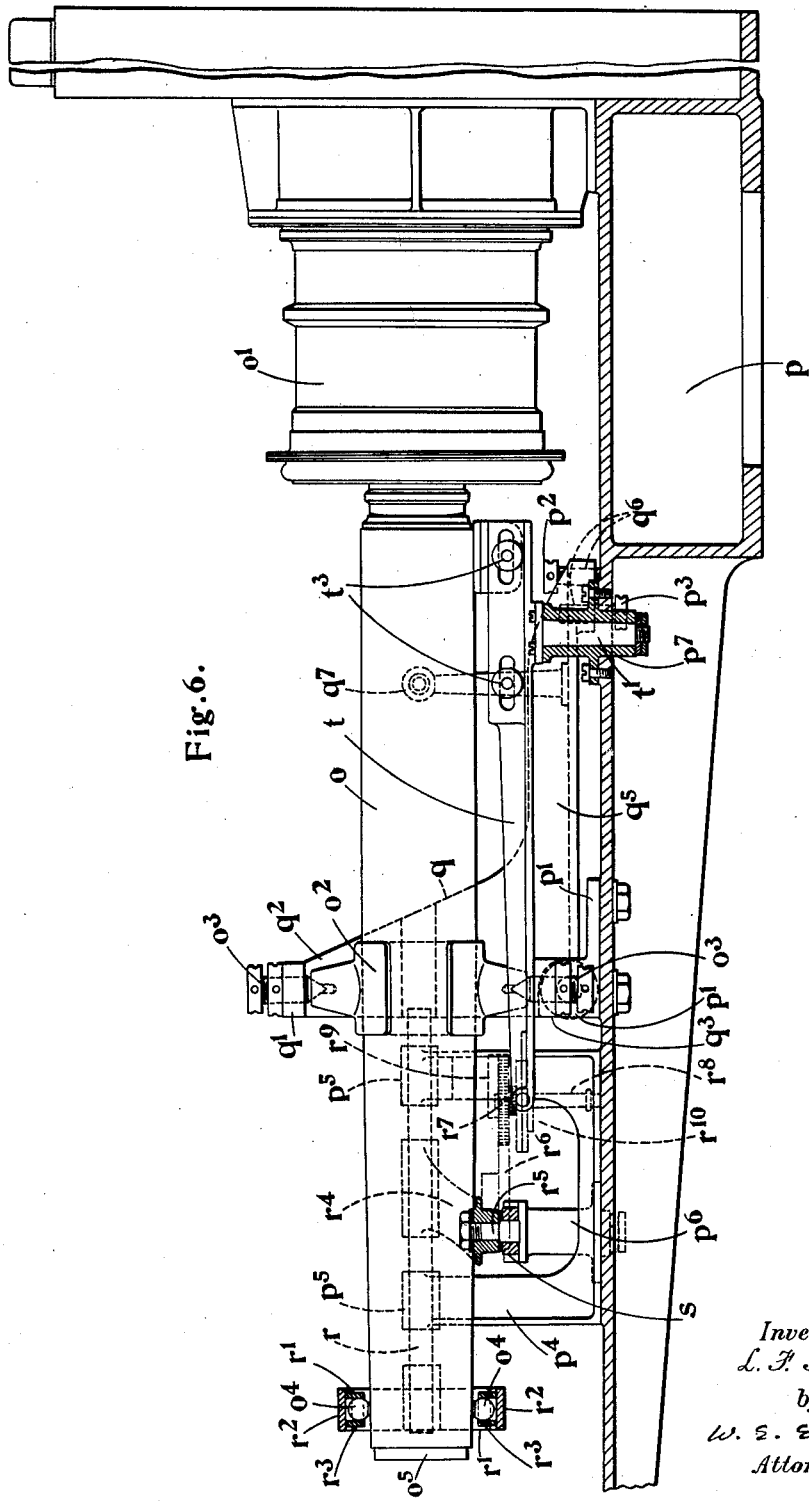
Figures 6 and 7 are respectively a side elevation partly in section, and a plan view of a second design of mechanism.
Figure 7:
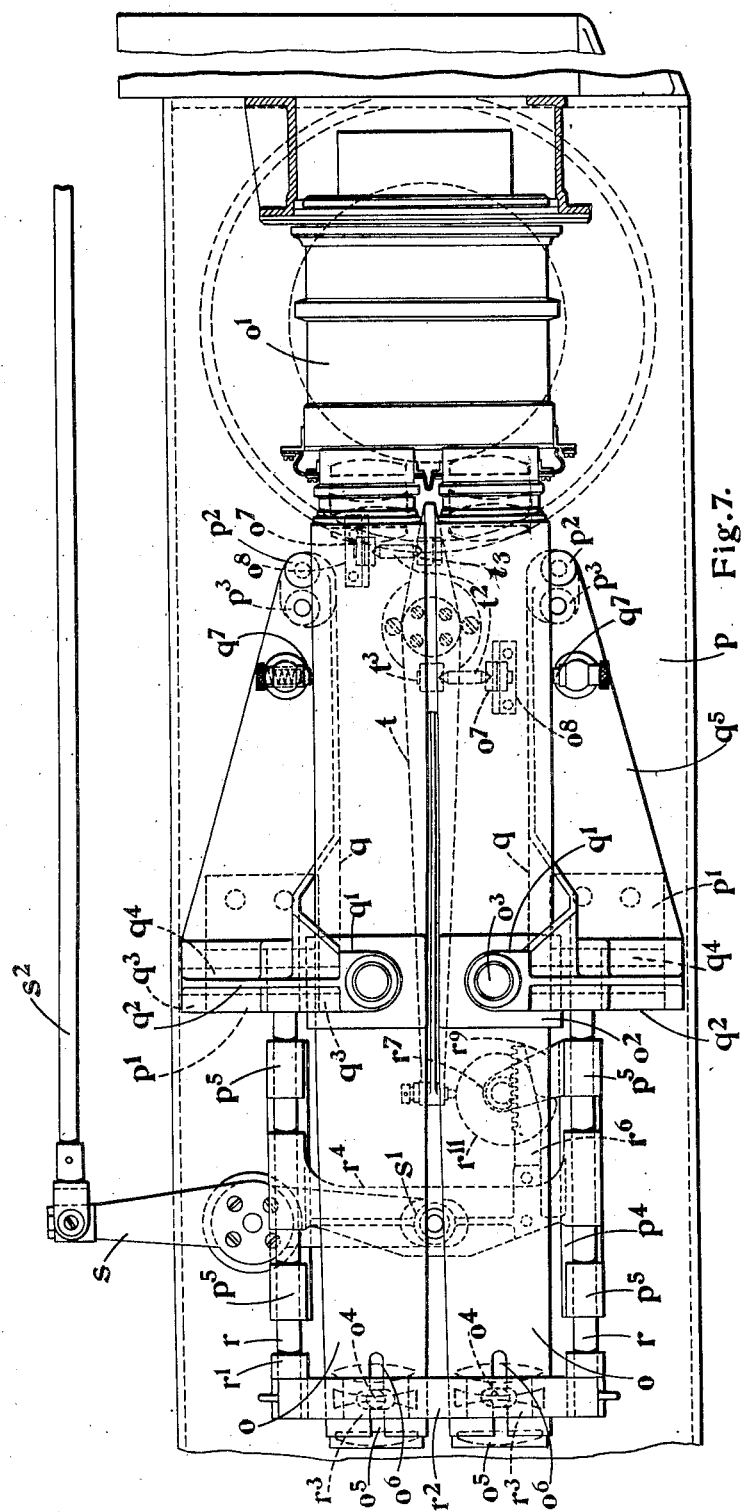

According to another construction of mechanism in which the separate view point images are received by parallel disposed optical systems and superposed on a plane transverse to the axis of binocular vision, either directly or by way of a superposing lens, as illustrated in Figures 6 and 7 of the accompanying drawings, tubular casings $o$ containing the components of the optical systems are mounted in such manner that they may be given a slight angular movement about axes transverse to the axis of binocular vision in order to secure superposition of the various object planes and at the same time the objective lenses are given an axial movement to secure the corresponding adjustment of focus in accordance with the particular plane that is at the moment superposed. For this purpose the camera and the tubular casings, together with the superposing lens $o^1$, are mounted upon an axially extending base member $p$ which serves to support the whole aggregate of components. The tubular casings are supported approximately at the middle of their lengths by trunnion bands or carriers $o^2$ having trunnions above and below on a vertical axis for the reception of adjustable pivot pins $o^3$ advantageously with conical bearing extremities which are mounted in brackets $q$ carried by the base member $p$. The pivot pins are received into screw-threaded bearing lugs $q^1$ provided upon the said brackets and after adjustment are locked in position by means of lock nuts.

Each of the brackets $q$ supporting the tubular casings $o$ is provided with a transversely disposed portion $q^2$ upon which the bearing lugs $q^1$ are provided at the upper and lower extremities at one side. The said portion is also formed at the lower end with a transverse recess the ends of which are bounded by downwardly extending lugs $q^3$ bored for the reception of a pivot spindle $q^4$ which is mounted in a bearing block $p^1$ mounted upon the base member $p$, the said spindle extending on each side of the bearing block for entry into the bearing lugs $q^3$ of the brackets in which the spindle $q^4$ is advantageously secured. Each bracket $q$ is further provided with a rearward extension $q^5$ which is adapted to lie substantially in a plane parallel with the upper surface of the base plate $p$ and is provided at the rearward end with two screw-threaded holes $q^6$ bored in the vertical direction, which holes serve to receive two screw-threaded adjusting screws $p^2$, $p^3$ one of which $p^1$ extends through the base plate from below for engagement in one of the said holes, while the other adjusting screw $p^2$ passes downwardly through the second hole and is adapted to bear upon the upper surface of the base plate. By such means a microscopic angular adjustment of the pivotal axes of the tubular casings $o$ can be effected for the purpose of securing effective registration of the images thrown by the two optical systems.

Forward of the bearing brackets $q$ of the tubular casings $o$ there are mounted on the base plate $p$ two similar inverted U-shaped brackets $p^4$ each having at the upper end two bearings $p^5$ for the reception of horizontally disposed spindles $r$, the said brackets being so set upon the base plate $p$ that the said spindles are disposed parallel with the axis of binocular vision. The spindles $r$, which are slidably mounted within the said bearings $p^5$ are adapted to carry at the forward ends fittings $r^1$ in the form of upwardly and downwardly extending arms to which are secured transversely disposed bridge pieces $r^2$ extending across the tubular casings $o$ above and below and carrying on the inner surfaces adjacent the said tubular casings fittings $r^3$ in the form of open boxes of oblong cross-section. The said boxes serve to engage spherical knobs or studs $o^4$ mounted above and below in the mounts of the objective lenses $o^5$ which are slidably fitted within the tubular casings $o$, the latter being slotted longitudinally above and below at $o^6$ for the passage of the said studs. It will be noted that the construction described will permit of oscillation of the tubular casings about their pivotal axes and at the same time by reciprocation of the spindles $r$, which are parallel to the axis of binocular vision, the objective lenses may simultaneously be focussed. In order that such movements may be effected automatically and in synchronism, the spindles before referred to have secured to them a transverse bridge member $r^4$ which, at the middle, carries a stud $r^5$ fixedly mounted therein and extending downwardly and is received into an oblong slot $s^1$ formed in one end of a transversely disposed lever $s$, which is pivoted upon a pedestal $p^6$ suitably disposed to one side of the base plate $p$. The outer end of the said lever is provided in the form of a journal for the reception of the head or bearing portion of a connecting rod $s^2$ which is connected to a rotating element of the mechanism for the operation of the camera. Thus, by the oscillation of the said lever the objective lenses are given the axial movement necessary for focussing by reciprocation of the rods $r$ through the bridge member $r^4$.

The bridge member $r^4$ is also adapted to carry a fitting $r^6$ extending parallel with the axis of binocular vision and formed with a toothed rack adapted to engage a pinion having a vertical axis. The said pinion is carried by a vertically disposed spindle $r^8$ suitably mounted in a bearing arm $r^9$ secured to one of the bracket members $p^5$ and having a foot-step bearing in the base plate $p$. The said spindle is provided with a disc-like table or flange $r^{10}$ upon which is secured, by such means as screws, a disc cam $r^{11}$ serving to control the oscillation of the tubular casings. The form of the cam is determined according to the angular displacement of the axes of the optical systems necessary for a given object plane in order to secure superposition of the objects in the said plane and also in accordance with the corresponding movement of the objectives necessary to secure focus of the objects in a particular plane. The cam is adapted, in the oscillatory movement which it receives from the fitting $r^6$ by way of the rack teeth and pinion $r^7$ to effect the oscillation of a lever $t$, disposed along the axis of binocular vision and pivoted upon a suitable vertically disposed pivot pin $t^1$ in a pedestal $p^7$ carried upon the base plate. Contact between the lever and the cam is effected by means of a screwed contact pin. The said lever is adapted to effect the oscillation of the tubular casings $o$ through loose abutment pins $t^2$ having conical ends which on the one hand engage adjustable abutment bearings $t^3$ provided upon the lever and on the other hand adjustable abutment bearing $o^7$ carried by brackets $o^8$ mounted respectively on the lower surfaces of the two tubular casings. The abutment bearings and abutment pin for one tubular casing are disposed in a position forward of the pivotal point of the lever, while the other abutment bearings and abutment pin are disposed to the rear of the pivotal point of the lever. The outward movement of the tubular casings $o$ produced by the lever $t$ is effected against spring buffers in the form of spring pressed plungers $q^7$ in casings carried by upstanding pedestals disposed at the outer sides of the tubular casings upon the bracket extensions $q^5$ and acting on the respective tubular casings in opposition to the pressure exerted by the lever.

Figure 8:
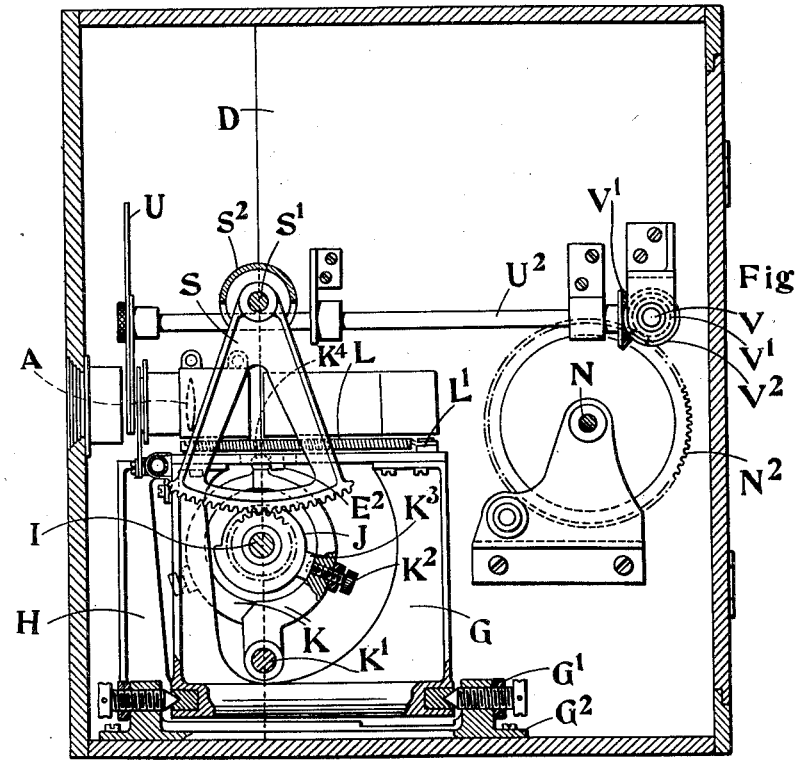
Figure 8 is a side elevation, partly in section, of a third design of mechanism.
Figure 10:
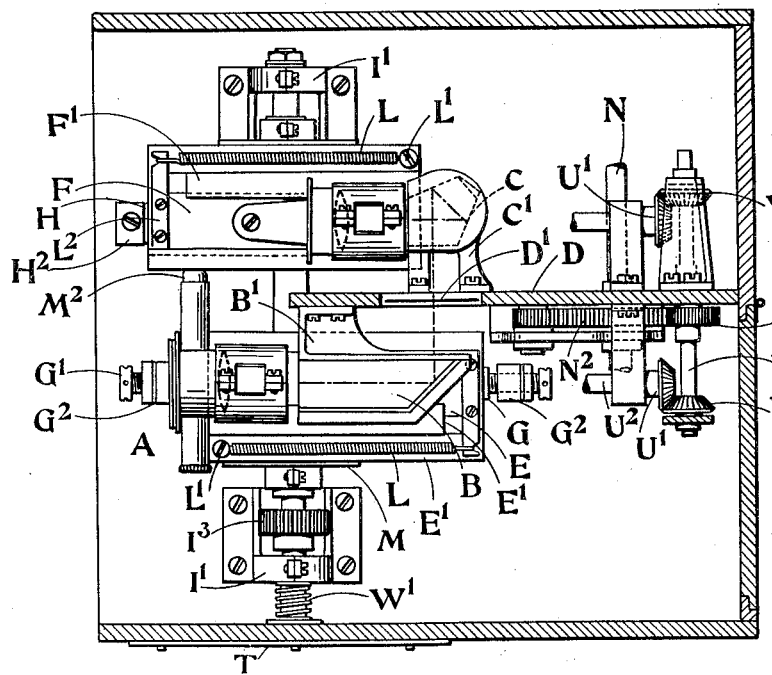
Figure 10 is a plan view of the third mechanism as described and illustrated in Figures 8 and 9.
Figure 9:
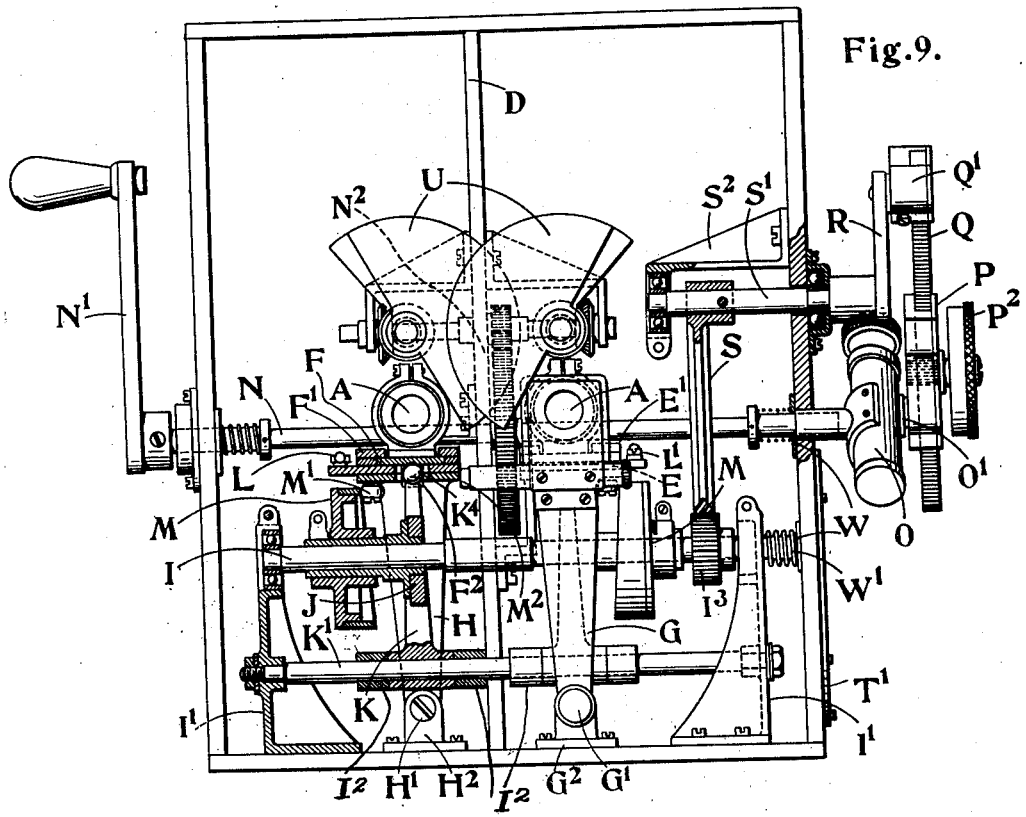
Figure 9 is an end elevation, partly in section, corresponding to Figure 8.
Figure 11:
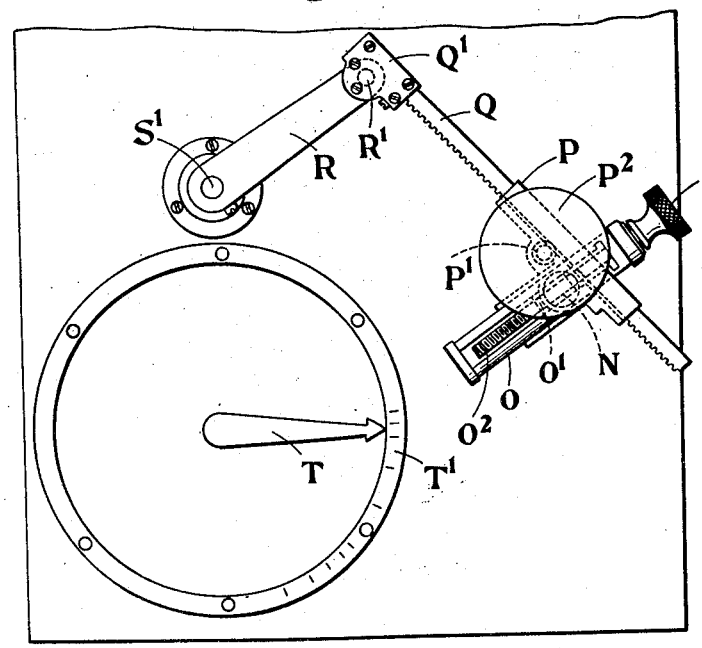
Figure 11 is an exterior view of the body of a camera fitted with the third mechanism.

In Figures 8 to 10 is illustrated another construction of mechanism according to the invention, which is specially applicable for use with optical systems serving to project the separated view point images upon a focal plane disposed along the centre line of binocular vision. Such an optical system is described in the specification of a co-pending application Serial No. 567,673, filed 8th October 1931, and comprises as its main components a pair of objectives A the rays from which are diverted to the focal plane by means of a 45° prism B or a mirror set at 45° on the one hand and on the other hand a pentagonal prism C by which the corresponding image is transmitted with correct disposition. The mechanism is provided to give to the objectives of the optical systems a reciprocatory movement in a direction transverse to the centre line of the binocular field and also an axial reciprocation for focus. The film gate determining the focal plane of the camera is mounted at $D^1$ upon a partition $D$ disposed in or approximately in the centre line of the binocular field and the prisms of the optical systems are disposed in fixed positions in mounts $B^1$, $C^1$ carried by the partition or some other fixed part of the camera case. The objectives are respectively mounted in split sleeves and secured in the adjusted positions therein by means of binding screws, the said sleeves being themselves mounted upon slides E, F which are disposed to slide in the axial direction of the objectives in suitable slideways $E^1$, $F^1$. The said slideways are provided or formed at the top of corresponding frames G, H, which at their lower ends are pivotally mounted by pivot pins $G^1$, $H^1$, in bearing brackets $G^2$, $H^2$, secured in fixed position in the camera body in such manner that the pivotal axes are parallel with the axes of the objectives, the slideways being provided advantageously horizontal in the normal position. The provision of the slides E, F, carrying the objectives thus allows for an axial or focussing movement of the objectives, while the mounting of the slides upon the pivoted frames G, H, permits of the movement of the objectives transverse to the centre line of the binocular field.

The required movements are effected from an oscillatory spindle I disposed transversely in the body of the camera below the slideways, the said spindle being conveniently supported in ball bearings in pedestals $I^1$ mounted on the base of the camera body. The said spindle carries for each slide a disc-like cam J, the radius of which varies from point to point along the periphery according to the adjustment of position of the objectives from the initial position that is necessary to secure focus of the objectives for objects of a corresponding distance. The movement of the spindle is transmitted through the cams to focussing levers K which are of scythe-like shape and have their fulcra pivotally mounted on a transverse spindle $K^1$ disposed below the oscillating spindle and fixedly mounted in the pedestals $I^1$ before referred to, the position of the respective levers along the spindle being determined by adjustable collars $I^2$. The said levers carry at about the middle of the curved portion a radially disposed adjusting screw $K^2$ upon the inner end of which is fitted a contact block $K^3$ for engagement with the surface of the corresponding cam. The upper end of the lever is fitted with a pivot pin substantially radially disposed with reference to the spindle upon which the levers are mounted, which pin carries a spherical roller $K^4$ adapted to engage with a contact surface formed upon a downwardly projecting lug $E^2$, $F^2$ or extension of the corresponding slide, which lug extends through a longitudinal slot in the corresponding slideway $E^1$, $F^1$. The slides are caused to follow the movement of the levers imparted thereto by the cams by means of springs L anchored at the one end to studs $L^1$ secured in position upon the slideways and at the other end to hook members $L^2$ secured to the slides.

The oscillating frame, lever and cam of one objective are advantageously disposed in the opposite or reverse position with respect to those of the second objective in order to secure balance of the forces produced by the movements imparted from the oscillating spindle I.

The transverse movement of the frames carrying the slideways for producing the required movement of the objectives for superposition of the separate view point images is also effected from the oscillatory spindle. For this purpose the spindle carries for each slideway a cup-like cam M secured in an adjusted position upon the spindle and having a cylindrical wall, the depth of which varies from point to point according to the adjustment of the distance between the objectives that is necessary to secure superposition of the two images for any particular distance of the object plane from the objectives. The said cams are caused to impart movement to the frames by way of spherical rollers $M^1$ mounted upon downwardly extending pivot pins provided on the lower surface of the upper part of the frames G, H, the said rollers bearing upon the operative surfaces of the cams. The frames are conveniently caused to follow the movements of the cams by means of a spring plunger $M^2$ mounted in a casing carried by one of the frames with a contact head formed on the plunger engaging the second of the frames.

The movement of the oscillatory spindle I is derived from the spindle N which serves for the operation of the film mechanism. The said spindle carries on the outer side of the camera body an adjustable crank in the form of a hollow or cylindrical arm O transversely disposed to the said spindle and having slidably mounted therein a slide block $O^1$ which is mounted upon an axially disposed screw-threaded spindle $O^2$ which may be rotatably adjusted in position by means of a suitable knob or handle $O^3$ provided at the one end. The said slide block carries a crank pin on which is rotatably mounted in ball bearings a fitting P forming a slide bearing for a rod Q provided with a toothed rack, which rack engages a toothed pinion $P^1$, the spindle of which is mounted in ball bearings in the said fitting and carries at the outer end an adjusting knob or disc $P^2$. One end of the rod Q has fixedly secured to it a pivot fitting $Q^1$ in which there is received in ball bearings a pivot or crank pin $R^1$ upon a crank arm R, which at the other end is secured to a spindle $S^1$ disposed parallel with the oscillatory spindle I and is mounted in ball bearings on the wall of the camera body and also in a supporting bracket $S^2$ disposed on the inner face of the said wall. The said spindle has fixedly mounted upon it within the camera body a toothed quadrant S, the teeth of which engage with a pinion $I^3$ fixed to the oscillatory spindle I. It will thus be observed that in the rotation of the crank handle $N^1$ for the operation of the camera the hollow or cylindrical arm O is revolved, and in its revolution imparts through the toothed rod Q an oscillatory movement through a determined angle to the crank arm R connected to the spindle $S^1$ of the toothed segment S and by means of the adjustments provided it is possible to set the objectives of the optical systems for the particular average distance of the scene or view to be photographed and at the same time to focus the objectives A for that distance and to determine also the depth or range over which superposition and focus of the separate view point images is required. Thus, by adjustment of the position of the toothed rod Q the toothed segment S is partially rotated in one direction or the other to effect a partial rotation of the oscillatory spindle I and through it, by adjustment of the cams, to adjust the objectives for the particular average distance, while the required depth of field is secured by adjustment of the slide block $O^1$ in the hollow arm O, since by increasing or decreasing the eccentricity of the crank pin of the block $O^1$ the angle of oscillation of the oscillatory spindle I is adjusted. The adjustments referred to are conveniently indicated by means of a pointer T mounted on the outer extremity of the oscillatory spindle and co-operating with an annular scale $T^1$ mounted on the exterior of the body of the camera.

The spindle N operating the film mechanism may also be adapted to effect the rotation of shutters U co-operating with the objectives A. For this purpose the spindle carries a toothed wheel $N^2$ engaging a pinion $V^1$ upon a second spindle V parallel thereto, which spindle carries bevel wheels $V^2$ driving through other bevel wheels $U^1$ on spindles $U^2$ extending forwardly above the respective objectives and carrying at the forward ends the shutters U which are of adjustable cut-off. The said shutters may be set to co-operate with fixed screens of cylindrical form and with similar screens co-operating therewith where necessary and mounted fixedly in relation to the sleeves carrying the objectives.

The spindles which extend through the walls of the body of the camera are conveniently provided with light traps in the form of flanged tubular sleeves as at W, mounted upon the spindles and maintained with their flanges in engagement with the walls by means of light spiral springs $W^1$. Screens of sheet metal may also be provided within the body of the camera where necessary to avoid the effect of extraneous light.

I claim:

1. Means for producing optical representations of objects with steroscopic effect, comprising a pair of similar optical systems each consisting of components that include an objective lens, such objective lenses being relatively disposed with reference to a sight axis to produce separate view point images having stereoscopic relation, and transmitting components adapted to project said images in superposition upon a focal plane common to the optical systems, supports for the objective lenses of the respective optical systems, which supports are mounted for an oscillatory movement in a direction transverse to the sight axis for the variation of the ocular distance between the objective lenses of the two systems, mounts upon the said supports for the objective lenses, the said mounts being adapted for a movement of oscillation in the direction of the axis of the respective objective lenses, and means automatically to impart movements of oscillation to the said supports with reference to the sight axis for the successive superposition of the images of objects at different distances comprised in the separate view point images, and movements of oscillation of the mounts of the objective lenses in the axial direction accurately to focus the objective lenses upon the said objects simultaneously with the superposition of the images of the said objects, and driving mechanism for continuing the said movements of oscillation of the said supports and the said mounts cyclically during the period of the production of the optical representations.

2. Means for producing with the illusion of motion optical representations of objects with stereoscopic effect, according to claim 1, provided with a driving member and transmission mechanism connecting said driving member with said supports and said mounts, said transmission mechanism having a ratio of transmission in relation to the speed of movement of the driving member such that the supports and mounts carry out the cycle of movement so that the change from object plane to object plane is effected in a period of time of the order of $\frac{1}{4}$th to $\frac{1}{8}$th of a second determined by the persistence of vision, whereby the separate view point images in successive representations are merged one into the other and the observer is enabled to retain the impression of one view point image until the other is presented with sufficient intensity to be obtrusive.

3. Means for producing optical representations of objects with stereoscopic effect, according to claim 1, having the said supports mounted for an angular movement of oscillation about axes transverse to the axes of the respective optical systems for the purpose of securing the successive superposition of images of the objects at different distances comprised in the separate view point images.

4. Means for producing optical representations of objects with stereoscopic effect, according to claim 1, having the supports mounted for a movement of reciprocation in the horizontal plane transverse to the axes of the optical systems for the purpose of securing the successive super position of the images of the objects at different distances comprised in the separate view point images.

5. Means for producing optical representations of objects with stereoscopic effect, according to claim 1, having the mounts for the objective lenses mounted for an axial movement of reciprocation upon the supports in relation to the remaining components of the optical systems in order that they may be accurately focussed on the said objects simultaneously with the superposition of the images of the said objects.

6. Means for producing optical representations of objects with stereoscopic effect, comprising a pair of similar optical systems each consisting of an objective lens relatively disposed with reference to the axis of sight so that the said lenses produce separate view point images having stereoscopic relation, transmitting lenses in juxtaposed positions with reference to the said axis of sight, and intermediate prismatic components for passing the rays of light from the objective lenses to the transmitting lenses, and a common superposing lens, the said optical systems including the superposing lens serving to project the said images in superposition, carriers for said optical systems pivotally mounted upon axes transverse to the axes of the respective optical systems, operating levers mounted in fixed relation to said carriers, an operating element common to said levers and adapted for reciprocation to impart an angular movement to said levers about the corresponding pivotal axes, means for imparting a reciprocating movement to said operating element whereby an angular movement of oscillation is imposed upon the optical systems for the successive superposition of the images of the objects at different distances comprised in the separate view point images, the objective lenses of the optical systems being mounted to permit a movement of oscillation for the purpose of accurately focussing them upon the said objects simultaneously, and means automatically to effect the movements of oscillation continually so long as the production of the optical representations continue.

7. Means for producing optical representations of objects with stereoscopic effect, according to claim 6, comprising also carriers for the objective lenses of the said optical systems, elements by which said carriers are supported from the pivotal axes of the respective optical systems with freedom for axial movement, and means whereby the reciprocating operating element may impart an axial movement to the lens carriers.

8. Means for producing optical representations of objects with stereoscopic effect, according to claim 6, comprising means for imparting movement to the reciprocating operating element, consisting of a crank mechanism, a spindle by which said crank mechanism is carried, and a bearing member for said spindle.

9. In means for producing optical representations of objects with stereoscopic effect, according to claim 6, means upon the reciprocating operating element whereby on axial adjustment of the said element the operating levers of the optical systems are adjusted relatively to each other, a crank mechanism imparting the movement of reciprocation to the operating element, a spindle bearing the crank mechanism, and a bearing member in which said spindle is mounted, said bearing member being adjustable in the direction of movement of reciprocation of the operating element for the purpose of adjusting the position of the operating levers of the optical systems.

10. Means for producing optical representations of objects with stereoscopic effect, according to claim 6, provided with a crank mechanism for imparting a movement of reciprocation to the operating element, a spindle carrying said crank mechanism, a bearing sleeve for supporting said spindle, an intermediate sleeve between the spindle and the bearing sleeve, said crank mechanism having a crank pin adjustable transversely to the axis of the spindle, and means connecting said crank pin with said spindle, whereby on relative angular adjustment of the spindle and the intermediate sleeve adjustment of the eccentricity of the crank pin results.

11. Means for producing optical representations of objects with stereoscopic effect, according to claim 6, provided with means for imparting a reciprocatory movement to the operating element consisting of a crank mechanism, a spindle by which said crank mechanism is carried, a bearing sleeve for said spindle, an intermediate sleeve between said spindle and said bearing sleeve, a driving shaft transverse to said spindle two helical gear wheels in fixed relation upon said driving shaft, a gear upon said intermediate sleeve engaging one of said helical gear wheels of said driving shaft, a counter spindle parallel with the driving shaft, two helical gears in fixed relation upon said counter spindle, one of said gears engaging the second gear upon the driving shaft, and a gear wheel in fixed relation to the crank spindle and in engagement with the second of the gears upon the counter spindle, the said counter spindle being longitudinally adjustable.

12. Means for producing optical representations of objects with stereoscopic effect, comprising a pair of similar optical systems each consisting of an objective lens and a transmitting lens in spaced axial relation, a carrying member for the said lenses of each optical system, mounts for the respective objective lenses mounted for axial movement upon the said carrying members, and a common superposing lens juxtaposed to the transmitting lenses of the respective optical systems, vertical pivots upon which said optical systems are mounted for angular oscillation, a reciprocating operating element, an operating lever common to said optical systems and adapted for a movement of oscillation to be imparted to said optical systems, means for effecting the movement of the reciprocating element, carriers for the objective lenses adapted for axial movement, and means for imparting movement from the reciprocating element to the said carriers.

13. Means for producing optical representations of objects with stereoscopic effect, according to claim 12, provided with an oscillatory cam, means upon the reciprocating element for effecting the operation of the cam, and means for transmitting movement from the cam to the common oscillatory lever.

14. Means for producing optical representations of objects with stereoscopic effect, according to claim 12, comprising a lever disposed parallel with the axes of the optical systems and pivoted for oscillation in a plane parallel with the said axes, means for imparting a movement of oscillation to said lever, and transmitting the movement of oscillation of the lever respectively to the said optical systems from opposite sides of the fulcrum of the lever.

15. Means for producing optical representations of objects with stereoscopic effect, according to claim 1, provided with carriers for the optical systems each supported for oscillatory movement about an axis parallel with the axes of the optical systems, and means for imparting a movement of oscillation to the said carriers.

16. Means for producing optical representations of objects with stereoscopic effect, according to claim 1, provided with carriers for the optical systems, each supported for oscillatory movement about an axis parallel with the axes of the optical systems, carriers for the objective lenses of the said optical systems mounted for axial reciprocation on slides upon the carriers of the optical systems, and means for imparting to the carriers of the objective lenses a movement proportional to the movement of oscillation of the carriers of the optical systems.

17. Means for producing optical representations of objects with stereoscopic effect, according to claim 1, provided with carriers for the optical systems, each supported for oscillatory movement about an axis parallel with the axes of the optical systems, carriers for the objective lenses of the said optical systems mounted for axial reciprocation on slides upon the carriers of the optical systems, and means for imparting to the carriers of the objective lenses a movement proportional to the movement of oscillation of the carriers of the optical systems, and cams for imparting the said movements to the carriers of the objective lenses and the optical systems.

18. Means for producing optical representations of objects with stereoscopic effect, according to claim 1, provided with carriers for the optical systems, each mounted for oscillatory movement about an axis parallel with the axes of the optical systems, carriers for the objective lenses of the said optical systems provided for axial reciprocation on slides, a rotating driving shaft, a cam spindle, means for imparting from said driving shaft to said cam spindle a movement through a variable angle of oscillation, and cams upon said cam spindle for effecting the oscillatory movements of the carriers of the optical systems and of the objective lenses.

19. Means for producing optical representations of objects with stereoscopic effect, according to claim 1, provided with carriers for the optical systems, each mounted for oscillatory movement about an axis parallel with the axes of the optical systems, carriers for the objective lenses of the said optical systems provided for axial reciprocation on slides, a rotating driving shaft, a cam spindle, means for imparting from said driving shaft to said cam spindle a movement through a variable angle of oscillation, and cams upon said cam spindle for effecting the oscillatory movements of the carriers of the optical systems and of the objective lenses, the zero position of the cam spindle being angularly adjustable.

LAWRENCE FRANCIS SAVAGE.